United States Patent Office 3,647,897
Patented Mar. 7, 1972

---

3,647,897
BIS-CYCLOPENTADIENYLIC COMPOUNDS AND PROCESS OF PREPARING SAME
André Lakodey and Francis Weiss, Pierre-Benite, France, assignors to Ugine Kuhlmann
No Drawing. Filed Nov. 28, 1969, Ser. No. 880,994
Claims priority, application France, Nov. 29, 1968, 175,924
Int. Cl. C07c *13/62*
U.S. Cl. 260—666 PY                 2 Claims

ABSTRACT OF THE DISCLOSURE

Novel products comprising 1,3-bis-cyclopentadienyl 2-methylene propane of the following formula:

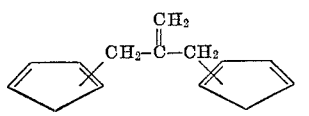

(I)

and its novel isomer, dicyclopentadiene having the following structure

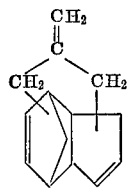

(II)

The novel products are prepared by reacting a 1,3-dihalogeno 2-methylene propane with an organometallic derivative of cyclopentadienyl in the presence of an inert solvent.

BACKGROUND OF THE INVENTION

Field of the invention

The field of the invention relates to novel bis-cyclopentadienyl compounds and its dicyclopentadiene isomers and to the process of producing these products.

Bis-cyclopentadienylic compounds of a general nature are known and are used for preparing synthetic thermosetting resins which resins can be used, for example, as electrical insulators of high quality especially for high frequency. U.S. Pat. 2,726,323, British Pat. 1,007,834, French Pat. 1,345,817 and the article published by Renner, Widmer and Schulthess in Kunststoffe, 53, p. 509 (1963) all disclose various types of bis-cyclopentadienylic compounds for the formation of thermosetting resins, by homopolymerization or copolymerization with other dienic compounds.

A general characteristic of the known bis-cyclopentadienylic compounds is their instability in their monomeric state. They are quite reactive even at room temperature and quickly react to form dimers and oligomers or polymers having a relatively poor stability by dienic polyaddition according to the following equation:

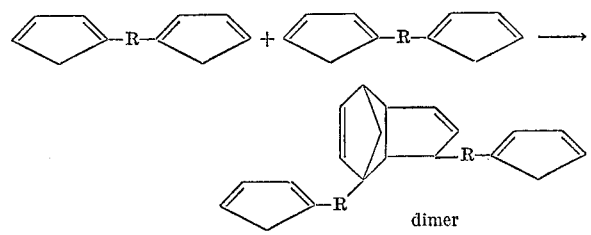

dimer

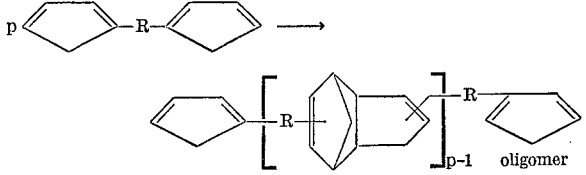

It can thus be seen that owing to the fact that both the dimers and oligomers still contained two cyclopentadienylic groups which are reactive at the end of the molecule, this polyaddition has a tendency to continue and consequently these products only have a limited conservation time and if they are to be polymerized or copolymerized to form thermosetting resins, the polymerization reactions must be carried out as soon as possible.

SUMMARY OF THE INVENTION

This invention relates to the novel 1,3-bis-cyclopentadienyl 2-methylene propane of the following formula:

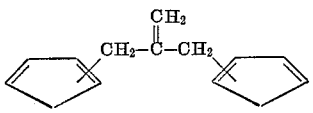

(I)

and its novel dicyclopentadiene isomer of the following structure:

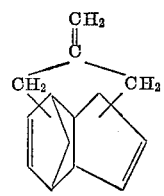

(II)

and to a process for producing the novel products by reacting a 1,3-dihalogeno 2-methylene propane with an organo metallic derivative of cyclopentadienyl in the presence of an inert solvent.

The applicants have found that the 1,3-bis-cyclopentadienyl 2-methylene propane (I) forming part of the subject of this invention behaves quite differently from the known bis-cyclopentadienylic compounds. The compound of Formula I reacts at room temperature by intramolecular dienic addition to produce the isomeric product having the structure of compound (II) which is thoroughly stable and does not react to give dimers and oligmers by intermolecular polyaddition as occurs with the known biscyclopentadienylic compounds since it is free from dienic reactive groups. The fact that the bis-cyclopentadienylic compound (I) can be kept and handled in its monomeric state in the form of its isomer (II) was quite unexpected. In addition to the stability advantage noted above, the fact that the bis-cyclopentadienylic compound reacts to form an isomer thereof makes distillation of the product much easier and greatly simplifies purification thereof.

The dienic intramolecular reaction of compound (I) to its isomer (II) is reversible by heating the isomer (II) to above about 150° C. which regenerates compound (I).

The relationship between compounds (I) and (II) is comparable to the relationship which exists between the monomeric cyclopentadiene and the dicyclopentadiene and is explained by the structural relationship of the compound (II) and the dicyclopentadiene.

Compound (I) thus exists above about 150° C. in its open reactive form, having a bis-cyclopentadienylic character and can thus be polymerized by heating alone to form hardened thermosetting insoluble resins according to known techniques and processes for transforming or polymerizing bis-cyclopentadienylic compounds. The compound (I) can also be copolymerized with other dienes or other known copolymerizable monomers such as butadiene and isoprene or with dienophile compounds, such as maleic anhydride and polyesters based on maleic esters. The processes and techniques for polymerizing or copolymerizing the bis-cyclopentadienylic compounds of this invention can be accomplished in known manners for the polymerization or copolymerization of known bis-cyclopentadienylic compounds such as described in the patents referred to above.

The process of preparing the compounds according to this invention involves reacting a 1,3-dihalogeno 2-methylene propane with an organo metallic derivative of cyclopentadienyl in the presence of an inert solvent.

The halogens attached to the methylene propane can advantageously be chlorine, bromine or iodine.

The organometallic derivatives of the cyclopentadienyl are advantageously alkali metal derivatives such as cyclopentadienylsodium, cyclopentadienyl-potassium, or the bromide of the cyclopentadienyl-magnesium. Other known organometallic derivatives of cyclopentadienyl could be used in practicing this invention so long as they were capable of producing the compounds of this invention as will be apparent to those skilled in the art.

Various inert solvents can be used as the reaction medium which are inert towards the organometallic derivatives, including aliphatic hydrocarbon and aromatic hydrocarbon solvents such as cyclohexane, methylcyclohexane, benzene, toluene, xylene and so forth. The organometallic derivatives of cyclopentadienyl can be prepared in a manner well known in the art.

The process of reacting 1,3-dihalogeno 2-methylene propane with the organometallic derivative of cyclopentadienyl can be carried out under various process conditions of temperature, pressure and time as will be apparent to those skilled in the art. Various proportions of the 1,3-dihalogeno 2-methylene propane and the organometallic derivative of cyclopentadienyl can be used as will be apparent to those skilled in the art, but it is preferred to use a stoichiometric excess of the organometallic derivative of the cyclopentadienyl since two moles of the cyclopentadiene moiety is being combined with one mole of the 1,3-dihalogeno 2-methylene propane.

EXAMPLE

Cyclopentadienyl-sodium is prepared by adding 22 g. of molten sodium to 500 cc. of xylene in a suitable reaction vessel at 115–120° C. The mixture of sodium and xylene was vigorously stirred in order to obtain a fine scattering or disbursion of the sodium metal. Five drops of oleyl alcohol was then added to the sodium xylene mixture and it was then cooled down to room temperature. 0.5 g. of p-phenylenediamine and 3 cc. of tertiary butanol were then added to this reaction mixture at approximately room temperature and 67.3 g. of monomeric cyclopentadiene was then added to the sodium containing solution and the reaction cooled to maintain the temperature between 25 and 30° C. The reaction mixture was then placed under a nitrogen atmosphere and allowed to react for 15 hours at a temperature of between 20 and 25° C.

After the above reaction had been completed, producing the cyclopentadienyl-sodium compound in suspension, the suspension was then heated to 40° C. and 53.3 g. of 1,3-dichloro 2-methylene propane were added thereto over a period of one hour. The reaction mixture was then heated for one hour at 100° C. and then cooled down to approximately room temperature. The residual alkalinity in the reaction mixture was then neutralized with acetic acid and the insoluble salts filtered therefrom.

The xylene was distilled from the reaction mixture between 40 and 50° C. under 20 mm. of mercury. The pressure of the reaction mixture was then adjusted between about 0.1 to 0.5 mm. of mercury. Four g. of a mixture containing xylene and a small amount of 1,3-bis-cyclopentadienyl 2-methylene propane (I), was collected by distillation between 25 and 60° C. A further fraction boiling between about 58 and 62° C. was collected under 0.3 mm. of mercury weighing 37 g. comprising the dicyclopentadiene according to the structure of compound (II).

$$n_D^{20}=1.5448 \quad d_4^{20}=1.0282$$

This pure fraction represented about 45 percent by weight of the theoretical quantity. 25 g. of a residue remained which consisted of a mixture of the dicyclopentadiene isomer (II) and oligomers of compound (I).

The infra-red spectrum of this product is very similar to the one of the dicyclopentadiene: absorption bands at 3,080, 3,055, 1,660, 1,640, 1,610, 755, 725 cm.$^{-1}$ (non-conjugated cyclic double bonds); 880–890 ($CH_2=C<$).

The catalytic hydrogenation shows that there are three double bonds per 184 units of mass.

A liquid chromatography examination on a thin layer at room temperature showed that the product was homogeneous.

Chromatography examination in a gaseous phase at 160–180° C. on the other hand, showed the retrodienic reaction and compounds (I) and (II) are obtained and can be readily separated. The trapping of the chromatographic fractions, in the usual manner and their analysis by infrared and mass spectrometry proved the existence of the two isomers. The infra-red spectrum of (I) differed from the one of compound (II) and was like the one of the monomeric cyclopentadiene: bands at 3,075, 1,645, 1,600, 1,520, 670 (cis-conjugated cyclic double bonds), 890 ($CH_2=C<$) cm.$^{-1}$.

The mass spectrum of both products were superimposable, qualitatively and quantitatively. The main peaks of the spectrum (in parentheses the relative intensities) appeared at m/e: 184 (96.5), 169 (90), 156 (25), 155 (41), 143 (46), 141 (52), 129 (53), 117 (70), 104 (100), 91 (51), 77 (75), etc.

The equilibrium existing between both products at 160–180° C., was proved by the fact that each of the compounds (I) and (II) so separated, rechromatographed in a gaseous phase at this temperature, gave two peaks corresponding to both isomers.

The exact structure of the isomeric compound (II) has not been determined with any degree of certainty, but it is believed to be of the structure (II) as set forth above. It is known, however, that in the alkylation products of cyclopentadiene, of which the derivative (I) forms a part, the substitution on the nucleus can be situated at various positions, such as on the saturated carbon atom or on one of the unsaturated carbon atoms. According to the exact structure of compound (I) the dicyclopentadiene (II) resulting from the intramolecular cyclization could possibly have various other structures, for instance:

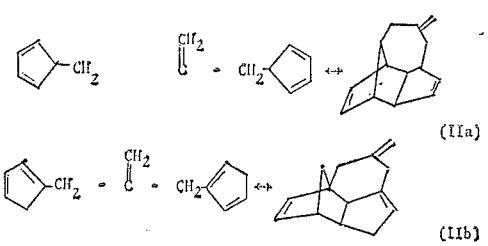

Thus it can be seen that different structures for the compound (II) might exist, but they all have the basic characteristics of being isomeric dicyclopentadienes.

We claim:
1. The compound 1,3-bis-cyclopentadienyl-2-methylene propane having the following structural formula:

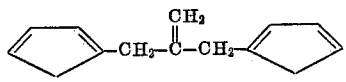

and its dicyclopentadiene isomer which is stabled at room temperature and reversible to 1,3-bis-cyclopentadienyl-2-methylene propane by heating at a temperature above 150° C.

2. The dicyclopentadiene isomer of 1,3-bis-cyclopentadienyl-2-methylene propane which is stable at room temperature and reversible to 1,3-bis-cyclopentadienyl-2-methylene propane by heating to a temperature above about 150° C. having the following structural formula:

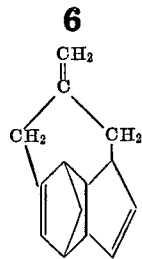

References Cited

UNITED STATES PATENTS 2,726,232   12/1955   Upson _____ 260—666 A

FOREIGN PATENTS 1,229,519   12/1966   Germany ____ 260—666 POLY

DELBERT E. GANTZ, Primary Examiner

V. O'KEEFE, Assistant Examiner

U.S. Cl. X.R.

260—93.1, 861, 346.6